March 1, 1949.  J. A. SIMS  2,463,124

CONNECTION FOR STRUCTURAL MEMBERS

Filed Oct. 1, 1945

JOSEPH A. SIMS
INVENTOR.

BY Lester B. Clark
Ray L. Smith

ATTORNEYS

Patented Mar. 1, 1949

2,463,124

UNITED STATES PATENT OFFICE 2,463,124

CONNECTION FOR STRUCTURAL MEMBERS

Joseph A. Sims, Houston, Tex.

Application October 1, 1945, Serial No. 619,576

3 Claims. (Cl. 287—119)

This invention relates to connectors or couplings, and is particularly concerned with such a device that is capable of forming a rigid connection between elongated members, but which may be readily released when a disconnect is desired.

The primary object of the invention is to provide a device that is easily assembled and disassembled but which forms and maintains a positive connection when in use.

Another object is to provide a device of the class described that is simple and inexpensive to construct and is efficient in providing a rigid connection between structural members.

A further object is to provide a structure that is of particular utility in forming a connection between tubular members used in forming a structural framework.

The invention is also of utility in forming masts, scaffolding and similar structures that are either temporary or permanent in nature.

The foregoing objects together with additional objects and advantages will be more fully apparent from the following description considered in connection with the accompanying drawings in which.

Figure 1:
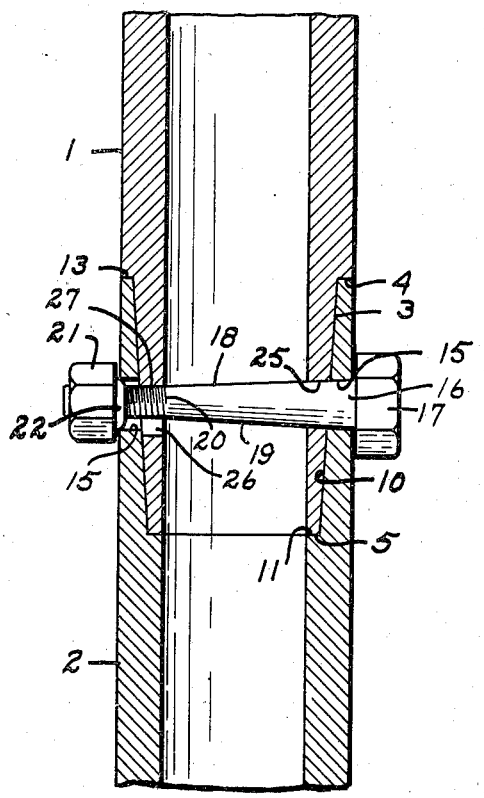
Fig. 1 is a vertical sectional view through two members that are interconnected in accordance with the invention.
Figure 2:
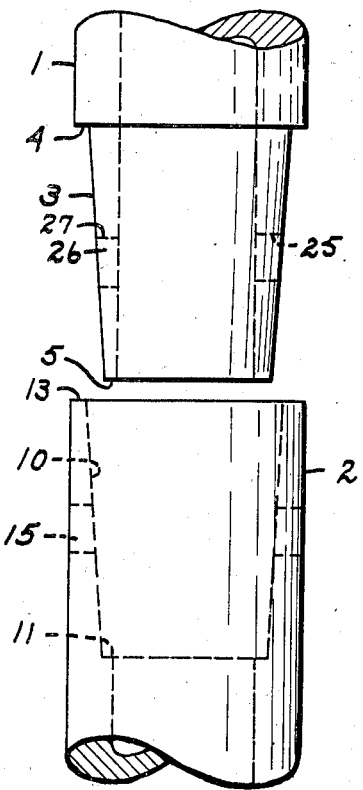
Fig. 2 is a partial elevational view of two members to be interconnected, such members being shown in the relative position preliminary to forming a rigid connection therebetween in accordance with the invention.

The device of the invention may constitute end portions of coupling members which are secured, as by conventional threads or otherwise, to long members which are to be interconnected, but I prefer that the invention shall comprehend the preforming of the ends of the members themselves by providing male and female ends on the members 1 and 2 that are to be interconnected. To this end the male member 1 is provided with a reduced end which includes the peripheral tapered surface 3 which terminates in outwardly facing surfaces comprising shoulder 4 and end surface 5.

The female member 2 is provided with a complementary end portion which comprises the truncated conical surface 10 adapted to frictionally engage the surface 3 as the surface 11 therein closely approaches the end 5 of the male member 1. Likewise the dimensions of the component parts are such that the end 13 of the female member approaches the shoulder 4 on the male member as the surfaces 3 and 10 enter into frictional and wedging engagement.

Intermediate the end 13 and the surface 11 on the female member 2 is a transverse hole or opening 15 of a size to receive the end 16 adjacent the head 17 of the bolt 18 of which the body is tapered as indicated at 19, and which terminates in the threaded end 20 which receives nut 21 having a boss or shoulder 22 of a size and configuration to wedgingly enter the hole 15.

Attention is directed to the fact that the hole 25 in one side of the male member 1 likewise fits closely about the bolt 18 and is so positioned that movement of the tapered portion 19 of the bolt through this opening draws the male member inward until the respective juxtaposed outwardly facing surfaces are pressed into engagement as the tapered surfaces 3 and 10 on the members 1 and 2 are wedged together during relative longitudinal movement of the members, while the bolt 18 is bolted into terminal position as shown in Fig. 1. At the same time of course, the shoulder 22 is wedged within the opening 15 opposite the head 17 and the bolt is thus held rigidly in position whereby permanency of the resulting connection is assured even though the composite structure is subjected to violent bending, tension and/or compression stresses.

To facilitate release of the connection with the minimum number of tools, a wrench and hammer being adequate for this purpose, the opening 26 opposite the opening 25 in the male member 1 is displaced axially outwardly toward the end of the member a sufficient distance that such displacement will not interfere with the completion of the connection in the manner just described, but will provide a slight eccentricity with the adjacent opening in the outer or female member 2. If then the nut 21 is removed the bolt 18 may be readily removed by impact thereon. The connection previously formed remains intact, however, inasmuch as the surfaces 3 and 10 are tightly wedged together and the paired outwardly facing surfaces on the respective members are in close engagement.

The bolt 18 may then be inserted into the aligned openings from the opposite direction whereby engagement will be made between the lower surface of the passage 15 in the female member and the upper surface 27 of the opening 26 in the male member. Preferably, although not necessarily, relative dimensions of the parts are such that the end portion of the bolt enters the opening 25 as such engagement takes place.

If then impacts are applied to the head 17 of the bolt 18, it seems apparent that the resulting wedging action will effect relative longitudinal movement whereby the connection between the interfitting male and female ends will be broken.

The members 1 and 2 may then be readily separated and it seems apparent that a reassembly of such ends can be readily effected by interfitting the male and female ends in such a manner that the smaller end of the bolt may enter the passage 15 in the female member and the passage 25 in the male member. If necessary impacts may be applied to force the members together until the threaded portion 20 of the bolt 18 protrudes beyond the periphery of the female member 2 whereupon the connection can be completed by tightening the nut 21 upon the bolt.

While the structural members 1 and 2 shown in the drawings are tubular, it is to be understood that the invention is not confined thereto in that it may be used with tubular members of any selected cross section or may be used with non-tubular members, since the invention broadly comprehends the provision of a connector or coupling which comprises complementary tapered male and female ends together with means capable of moving said interfitting ends into wedging engagement and also capable of releasing such engagement when disassembly of the connection is desired.

What is claimed is:

1. A connection for structural members comprising a female member having a tapered bore in the end thereof, a male member having a tapered end to fit within said bore, a passage through each of said members, each of said passages being of substantially uniform diameter, the passage in one of said members being inclined to the axis thereof so that the passages at one side of the connection are in alignment and are eccentric at the other side thereof when the connection is made up, and a tapered fastener adapted to enter the passages and move said alignable passages into alignment whereby the tapered surfaces of the male and female members are wedged into connected relation.

2. A connection for elongated members comprising, a female member having a tapered bore in the end thereof, a male member having a tapered end to fit within said bore, there being transverse passages through said members, the adjacent portions of the passages at the opposite sides of the members being respectively aligned and misaligned when the members wedgingly interfit, and a tapered lock member insertable at the side of the alignable portions of the passages to bring the members into wedgingly interfitting relation and insertible at the side of the misaligned portions to break the wedgingly interfit ends.

3. A connection for elongated members comprising, a female member having a tapered bore in the end thereof, a male member having a tapered end to fit within said bore, there being passages of substantially uniform diameter through said members, the passage through one of the members being inclined relative to the passage in the other member so that the passages are aligned at one end but misaligned at the other end when the members wedgingly interfit, a tapered bolt having a larger portion fitting within the aligned portions of said passages and the smaller end extending through the opening formed by the misaligned other end of the passages.

JOSEPH A. SIMS.

REFERENCES CITED

The following references are of record in the file of this patent:

UNITED STATES PATENTS

| Number | Name | Date |
|---|---|---|
| 616,273 | Strauser | Dec. 20, 1898 |
| 1,037,091 | Wedge | Aug. 27, 1912 |
| 1,132,375 | Myers | Mar. 16, 1915 |
| 1,636,421 | Knott | July 19, 1927 |
| 2,169,697 | Kangas | Aug. 15, 1939 |

FOREIGN PATENTS

| Number | Country | Date |
|---|---|---|
| 10,832 | Great Britain | May 8, 1913 |
| 10,253 | Great Britain | May 6, 1903 |
| 175,887 | Great Britain | Mar. 2, 1922 |